United States Patent
Wesch et al.

(10) Patent No.: US 12,158,194 B2
(45) Date of Patent: Dec. 3, 2024

(54) SECURING PIN, CHAIN CONNECTOR AND METHOD FOR SECURING A CHAIN CONNECTOR

(71) Applicant: RUD Ketten Rieger & Dietz GmbH u. Co. KG, Aalen (DE)

(72) Inventors: Rupert Wesch, Essingen (DE); Julian Jaros, Aalen (DE); Clemens Buck, Aalen (DE); Anne Kühling, Aalen (DE)

(73) Assignee: Rud Ketten Rieger & Dietz GmbH U. Co. KG, Aalen-Unterkochen (DE)

( * ) Notice: Subject to any disclaimer, the term of this patent is extended or adjusted under 35 U.S.C. 154(b) by 456 days.

(21) Appl. No.: 17/402,774

(22) Filed: Aug. 16, 2021

(65) Prior Publication Data
US 2022/0056985 A1 Feb. 24, 2022

(51) Int. Cl.
*F16G 15/06* (2006.01)
*B65G 17/38* (2006.01)
(Continued)

(52) U.S. Cl.
CPC .............. *F16G 15/06* (2013.01); *F16G 13/14* (2013.01)

(58) Field of Classification Search
CPC .......... F16G 15/06; F16G 15/02; F16G 15/04; F16G 13/14; F16B 41/005; F16B 19/02; F16B 35/00; B65G 17/38
See application file for complete search history.

(56) References Cited

U.S. PATENT DOCUMENTS 6,216,435 B1 * 4/2001 Bogdan .................. F16G 15/02
59/85
2010/0037585 A1 * 2/2010 Mulle ..................... F16G 15/02
59/87
2015/0226287 A1 * 8/2015 Brodziak ................ F16G 15/04
59/87

FOREIGN PATENT DOCUMENTS

DE          4010399 A1 * 10/1991
DE         19914016 A1    10/2000
DE      202006016032 U1    12/2006

OTHER PUBLICATIONS

English translate (DE4010399A1), retrieved date Nov. 11, 2023.*
DE Office Action for DE Application No. 10 2020 121 972.5.

* cited by examiner

Primary Examiner — Mohammed S. Alawadi
(74) Attorney, Agent, or Firm — Timothy W. Menasco, Esq.; Harter Secrest & Emery LLP (57) ABSTRACT

The invention relates to a securing pin (16) which, in order to secure two chain connector shackles (12, 14) of a chain connector (10) against becoming disengaged, can be inserted into an opening (28) formed by the two chain connector shackles (12, 14), comprising a base body (30) with a through-hole (32), at least one spring ring (34), at least two balls (36), and a securing member (38) inserted into the through-hole (32), wherein an annular groove (54) in which the spring ring is inserted (34) is provided in a lateral surface (59) of the base body (30), wherein the annular groove (54) is provided with two bore holes (66) which are aligned with the through-hole (32) and in which the balls (36) rest, and wherein the spring ring (34) has at least one leg (64) which extends in the longitudinal direction of the base body (30) and which bends out of shape if the securing pin (16) is inserted into the opening (28) incorrectly. The invention further relates to a chain connector (10)

(Continued)

for connecting two chains formed from links and to a method for connecting two chains by means of a chain connector (10) and for securing the chain connector shackles (12, 14) of the chain connector (10) against becoming disengaged by means of a securing pin (16).

19 Claims, 3 Drawing Sheets

(51) Int. Cl.
  *F16B 19/02* (2006.01)
  *F16B 35/00* (2006.01)
  *F16B 41/00* (2006.01)
  *F16G 13/14* (2006.01)
  *F16G 15/02* (2006.01)
  *F16G 15/04* (2006.01)

SECURING PIN, CHAIN CONNECTOR AND METHOD FOR SECURING A CHAIN CONNECTOR

The present invention relates to a securing pin which, in order to secure two chain connector shackles of a chain connector against becoming disengaged, can be inserted into an opening formed by the two chain connector shackles, comprising a base body with a through-hole, at least one spring ring, at least two balls, and a securing member inserted into the through-hole. The invention also relates to a chain connector with a securing pin and to a method for securing a chain connector with a securing pin.

Chain connectors of the type mentioned above most frequently consist of two congruent chain connector shackles that are in positive engagement with each other in order to connect two chains with each other, particularly two link chains, such as a round steel chain, for instance. To this end, each chain connector shackle reaches into a chain link of the chains to be connected. In the connected state, the chain connector thus forms a chain link of the two connected chains.

In order to secure the chain connector shackles against becoming disengaged, the use of a securing means is known which is positioned in such a way between the two chain connector shackles that the positive engagement provided between the two chain connector shackles is maintained.

A chain connector for link chains with connector parts that are detachably connected to each other is presented in DE 35 16 800 C1. In order to secure the two connector parts against becoming disengaged, a pin is provided, which braces the inner legs of the connector parts in the closed position of the chain connector and which comprises at least one retaining groove in which a catch spring is disposed. To avoid kinking of oval chain links hooked into the connector, anti-kinking means are provided, which are configured as elastic rubber or plastic buffers and are adhesively connected with the pin.

Further, a chain connector for a link chain is presented in DE 101 60 767 C2, which comprises two positively connected connector parts and a central part, which braces itself against the two opposite longitudinal bars of the connector parts and is detachably disposed between the connector parts. The central part comprises a fitting pin, a fitting member, which is configured in a sleeve-like manner and into which the fitting pin is inserted if the chain connector is closed, and a locking sleeve, which rest with its external lateral surface against the supporting surfaces of the longitudinal bars and into which the fitting member is inserted, with its external lateral surface resting against the internal lateral surface of the locking sleeve. The locking sleeve and the fitting member are inserted from opposite sides into their closing position in order to form the central part between the longitudinal bars, and the members inserted into their closing position from the opposite sides each comprise a stop for limiting the inserting movement, which cooperates with the longitudinal bars of the connector parts.

In addition, a chain connector for round link chains is presented in DE 44 20 203 C2, which consists of two congruent flat connector halves whose legs connect to rounded portions and positively engage each other by means of toothings that are disposed on the legs of the two connector halves in a direction transverse to a plane containing the legs and the rounded portions. As a safeguard against disengagement, a central part bracing the legs is inserted between the inner legs, which has a groove extending circumferentially in the connector plane for a spring member in the form of a hairpin-shaped rod spring and with a bore hole for a securing peg, which can be driven into the central part in a direction transverse to the plane containing the spring member and which retains the spring member in a positive engagement with grooves on the insides of the inner legs of the two connector halves.

The present invention is based on the object of providing a securing pin, a chain connector and a method for securing a chain connector, which make it possible to simply and positively recognize a correct and an incorrect installation and which, at the same time, exclude the possibility of reusing the securing pin in the case of an incorrect installation.

In order to accomplish the object, a securing pin with the features of claim 1, a chain connector with the features of claim 11, and a method for securing a chain connector with the features of claim 12 are proposed.

Advantageous embodiments of the securing pin are the subject matter of the dependent claims.

According to one aspect, a securing pin is proposed, which, in order to secure two chain connector shackles of a chain connector against becoming disengaged, can be inserted into an opening formed by the two chain connector shackles. The securing pin comprises a base body with a through-hole, at least one spring ring, at least two balls, and a securing member inserted into the through-hole, wherein an annular groove in which the spring ring is inserted is provided in a lateral surface of the base body, wherein the annular groove is provided with two bore holes which are aligned with the through-hole and in which the balls rest, and wherein the spring ring has at least one leg which extends in the longitudinal direction of the base body and which bends out of shape if the securing pin is inserted into the opening incorrectly.

The longitudinally extending leg serves as a positioning and/or installation aid when inserting the securing pin into an opening formed by the chain connector shackles. If the securing pin is correctly inserted into the opening, or installed correctly, then the leg is fully visible from the outside. If the securing pin is incorrectly inserted into the opening, or installed incorrectly, then the leg is bent out of shape during insertion or installation. The securing pin is thus destroyed and can no longer be used again, because the leg is bent. Thus, whether the securing pin is installed in the correct position is clearly recognizable. In contrast, the securing pins known from the prior art can be reused after being installed incorrectly and thus no longer meet the requirement of high availability. In addition, the securing pins known from the prior art can be incorrectly mounted again, which may result in a failure of the chain connector. In contrast, the securing pin according to the invention can no longer be reused after being installed incorrectly. Thus, the securing pin according to the invention exhibits high availability and safety.

In the present case, a correct installation is understood to mean that the leg is disposed so as to face towards a U-shaped connecting portion of the chain connector shackle, i.e. offset by 90° relative to the inner legs of the chain connector shackles. In the present case, an incorrect installation is understood to mean that the leg faces towards an inner leg of the chain connector shackles.

In an advantageous embodiment, the first leg projects perpendicularly from the spring ring. Advantageously, the leg is a perpendicularly bent end portion of the spring ring. In an advantageous embodiment, the spring ring has a ring portion from which the leg protrudes perpendicularly. Advantageously, the ring portion has at least one winding, wherein a free end of the winding is bent to form the leg. Advantageously, the winding is formed by bending a spring wire over at least 300°.

In an advantageous embodiment, the securing member is formed from two parts. Thus, the securing member may have a first sleeve, which is inserted, in particular pressed, into the through-hole, and a second sleeve inserted into the first sleeve. Advantageously, both sleeves are configured as clamping sleeves. Therefore, the securing member may also be referred to as a double clamping sleeve. In order to fix the securing pin in the opening, the securing member, in particular both sleeves, is driven into the securing pin. The two balls are thus pushed radially outwards against the spring ring. Consequently, the spring ring is pushed in each case into a recess of the chain connector shackles, so that the securing pin is fixed within the opening. The securing member may also be configured as a peg, e.g. a notched peg.

In an advantageous embodiment, the spring ring covers the balls inserted into the bore holes in the installed state of the securing pin. Advantageously, the ring portion covers the balls inserted into the bore holes in the installed state of the securing pin.

In an advantageous embodiment, the bore holes are dimensioned in such a way that a portion of the balls protrudes into the through-hole and, also advantageously, rests against the securing member. The two balls are thus pushed radially outwards when the securing member is driven in. In an advantageous embodiment, the two balls are positively inserted into the bore holes. Also advantageously, the bore holes are dimensioned in such a way that the balls cannot fall into the through-hole. In an advantageous embodiment, the bore holes are aligned perpendicularly to a central axis of the through-hole.

In an advantageous embodiment, the base body, the securing member, the ball and the spring ring are made from metal or plastic. Thus, all the parts of the securing pin are made of a recyclable material, so that the pin is fully recyclable.

The securing pin could be installed as follows. First, the securing member is inserted, in particular pressed, into the through-hole. The two balls are subsequently inserted into the bore holes, and then, the spring ring is inserted into the annular groove. In an advantageous embodiment, the balls are inserted into the bore holes from the outside, i.e. from the lateral surface.

In an advantageous embodiment, two spring rings rest in the annular groove. The use of two spring rings ensures that a correct or incorrect installation is recognizable when inserting the securing pin into the opening both from the top and from the bottom. Advantageously, each of the spring rings has a ring portion, which is formed of at least one winding, and a leg, which projects perpendicularly from the ring portion and extends in the longitudinal direction. In an advantageous embodiment, the ring portions of the two spring rings rest against each other in the installed state, so that the two legs extend in opposite directions. If the ring portions having at least one winding rest against each other, then the balls push against two windings, so that the pressure point of the balls is always stable.

In an advantageous embodiment, the leg rests in a longitudinal groove extending away from the annular groove. In an advantageous embodiment, each legs rests in a longitudinal groove. In an advantageous embodiment, a first longitudinal groove extends in a first longitudinal direction, and a second longitudinal groove extends in a second longitudinal direction opposite to the first longitudinal direction. Thus, a first leg extending in the first longitudinal direction can rest in the first longitudinal groove, and a second leg extending in the second longitudinal direction can rest in the second longitudinal groove. Advantageously, the longitudinal groove or grooves extends/extend perpendicularly away from the annular groove. Also advantageously, the longitudinal grooves are incorporated into the lateral surface of the base body.

In an advantageous embodiment, the spring ring has two legs extending into opposite longitudinal directions. Advantageously, the legs are configured as perpendicularly bent end portions of the spring ring. Advantageously, the legs protrude perpendicularly from the ring portion. Also advantageously, a first leg extends in a first longitudinal direction, and a second leg extends in a second longitudinal direction opposite to the first longitudinal direction. In an advantageous embodiment the two legs are situated opposite from each other in a plane extending in the longitudinal direction.

In an advantageous embodiment, the ring portion has two windings, wherein the end portions of the windings are bent perpendicularly in opposite longitudinal directions in order to form the legs extending in opposite longitudinal directions. Due to the two windings, the pressure point of the balls is always stable.

In an advantageous embodiment, the spring ring is made from a spring steel wire. Thus, the spring ring is inexpensive to manufacture. Advantageously, the ring portion inclusive of the leg extending in the longitudinal direction is produced by bending a spring steel wire. Also advantageously, the ring portion having at least one winding is produced by bending the spring steel wire over at least 300°. The leg may also be produced by perpendicularly bending an end portion of the spring ring. If the spring ring has two legs, the legs can be produced by perpendicularly bending the end portions of the spring ring in opposite longitudinal directions.

In an advantageous embodiment, the base body has two base body parts that are connected to each other positively, non-positively and/or by substance-to-substance connection. Thus, the two base body parts may be press-connected to each other, in particular transversely press-connected. Moreover, the two base body parts may be glued to each other or connected to each other in a substance-to-substance connection by galvanization. Also, the base body part may be press-connected, in particular transversely press-connected, and additionally connected to each other in a substance-to-substance connection by galvanization. Transverse press-connection may take place by heating the two base body parts differently. If the base body comprises two base body parts, then in an advantageous embodiment, the securing member is first inserted into the through-hole, the two balls are subsequently inserted into the bore holes, then, the spring ring or the two spring rings is/are pushed onto one of the base body parts, so that the ring portion or portions covers/cover the balls inserted into the bore holes and the at least one leg rests in the first longitudinal groove. Then, the second base body part is connected positively, non-positively and/or by substance-to-substance connection to the first base body part, so that the second leg rests in the second longitudinal groove.

In an advantageous embodiment, the first base body part has a head portion and a shaft portion, wherein the second base body part is connected to an end portion of the shaft portion, wherein, in the connected state, the head portion and the second base body part form groove walls of the annular groove and the shaft portion forms a groove bottom of the annular groove. Thus, the securing pin is inexpensive to produce, because the annular groove is produced only by assembling the two base body parts. In an advantageous embodiment, the head portion has a first external diameter, and the shaft portion has a second external diameter, wherein the first external diameter is greater than the second external diameter. In an advantageous embodiment, the end portion has a third external diameter, which is smaller than the second external diameter. Thus, a shoulder is produced which serves as a stop for the second base body part if the latter is pushed, in particular pressed, onto the end portion. Also advantageously, the second base body part has a fourth external diameter corresponding to the first external diameter.

In an advantageous embodiment, the longitudinal groove is incorporated into the head portion and/or the second base body part. Advantageously, the longitudinal groove is incorporated into a lateral surface of the head portion and/or the second base body part. If the spring ring has two legs projecting into opposite longitudinal directions, or if two spring rings are being used, both the head portion and the second base body part have a longitudinal groove.

In an advantageous embodiment, the first base body part is a hollow cylinder, and the second base body part is a ring. Advantageously, the ring is pushed, in particular pressed, onto an end portion of the hollow cylinder, in particular an end portion of the shaft portion. Preferably, the hollow cylinder is longer than the ring.

In an advantageous embodiment, a portion of the second base body part has a centering projection with an inserting bevel which, together, serve as an installation aid when inserting the securing pin into the opening. Advantageously, the centering projection is formed from a portion of the lateral surface of the second base body part. Also advantageously, the centering projection has a fifth external diameter, which is smaller than the fourth external diameter of the second base body part. Advantageously, the inserting bevel forms a transitional region between the fourth external diameter and the fifth external diameter. The inserting bevel may be configured as a bevel or chamfer.

According to another aspect, a chain connector for connecting two chains formed of links is proposed. The chain connector comprises a first chain connector shackle, a second chain connector shackle and a securing pin, wherein the two chain connector shackles positively engage each other and form an opening in which the securing pin is inserted.

In an advantageous embodiment, each of the chain connector shackles has a first leg, a second leg, and a connecting portion connecting the two legs with each other, wherein each of the legs has a toothing contour that engage each other in the connected state, and wherein the second legs face towards each other in the connected state. Due to the congruent configuration of the two chain connector shackles, a simple installation of the chain connector is possible. The first legs may be referred to as outer legs and the second legs may be referred to as inner legs. Advantageously, the inner legs facing towards each other have recesses which, in the assembled state, form the opening in which the securing pin inserted. Also advantageously, a depression is incorporated into each recess, into which a portion of the spring ring, particularly a portion of the ring portion, engages when the securing member, particularly the second sleeve or the peg, is driven into the first sleeve.

According to another aspect, a method is proposed for connecting two chains by means of a chain connector and for securing the chain connector shackles against becoming disengaged by means of a securing pin. In the method, first, one chain connector shackle is respectively hooked into an end of a chain link forming a chain. Subsequently, the two chain connector shackles are assembled so that toothing contours of the chain connector shackles positively engage each other and an opening is created between inner legs of the chain connector shackles. Then, the securing pin is inserted into the opening such that the at least one leg is arranged offset by 90° relative to the inner legs. Thereafter, the clamping sleeve is driven in so that the balls push the annular spring into depressions of the inner legs.

Offset by 90° relative to the inner legs means that the at least one leg faces towards a U-shaped connecting portion of one of the chain connector shackles. If the securing pin is incorrectly inserted into the opening in step c), i.e. the leg faces towards the inner leg, then the leg bends out of shape during insertion into the opening. The securing pin is thus destroyed and can no longer be used again.

Figure 1:
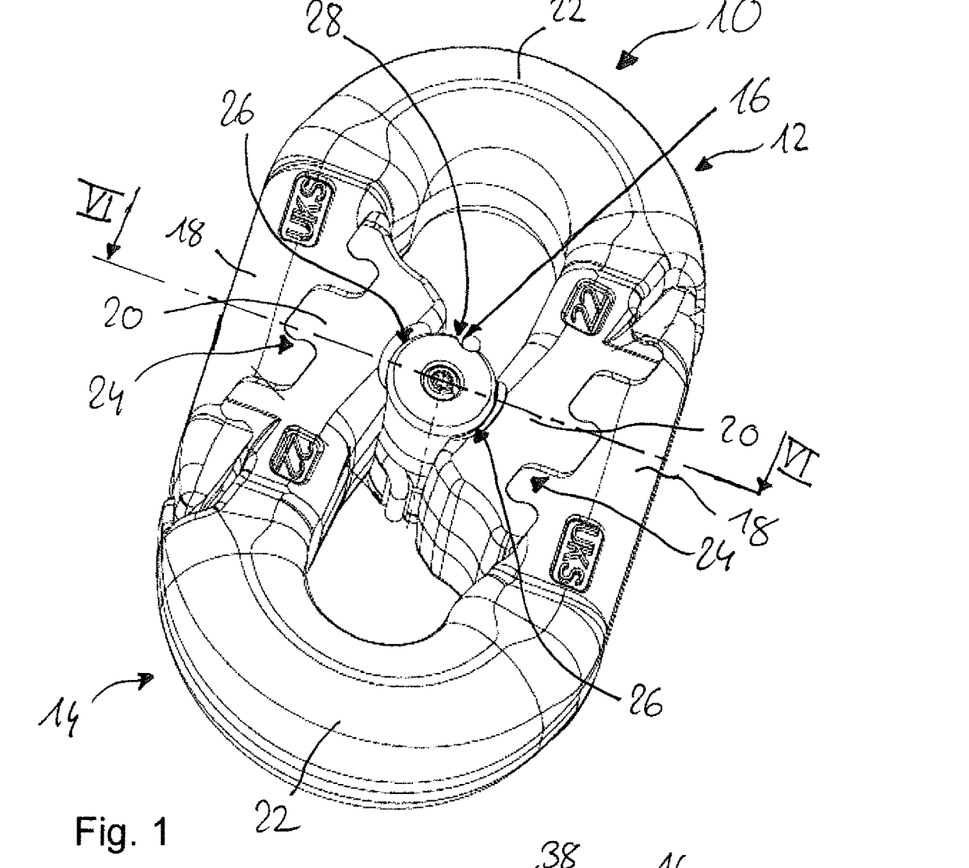
FIG. 1 shows a perspective view of a chain connector with a securing pin and spring rings in accordance with a first embodiment.

A securing pin, a chain connector and a method for installing and securing a chain connector as well as further features and advantages are explained in more detail below with reference to exemplary embodiments that are schematically shown in the Figures. In the Figures:

FIG. 1 shows a chain connector 10, which serves for connecting two chains that are not depicted, particularly two link chains used in a chain conveyor, e.g. a bucket conveyor and a trough chain conveyor, such as a round steel chain, for example.

The chain connector 10 comprises a first chain connector shackle 12, a second chain connector shackle 14 and a securing pin 16, which secures the two chain connector shackles 12, 14 against becoming disengaged.

The two chain connector shackles 12, 14 are configured to be congruent with each other, wherein each chain connector shackle 12, 14 has an outer leg 18, an inner leg 20 and a U-shaped connecting portion 22 connecting the outer leg 18 with the inner leg 20.

As is apparent in FIG. 1, the outer leg 18 and the inner leg 20 each have a toothing contour 24 that engage each other in order to connect the chain connector shackles 12, 14 with each other.

The inner legs 20 each have a recess 26 which, in the connected state of the chain connector shackles 12, 14, form an opening 28 into which the securing pin 16 is inserted in order to secure the chain connector shackles 12, 14 against becoming disengaged. As is apparent in the FIGS. 6 and 7, the recesses 26 are additionally provided with depressions 27.

As is apparent particularly in FIGS. 2 to 5, the securing pin 16 has a base body 30 with a through-hole 32, two spring rings 34, two balls 36, and a securing member 38.

The securing member 38 has a first sleeve 39 made of metal or plastic, which is inserted, in particular pressed, into the through-hole 32, and a second sleeve 41 made of metal or plastic inserted into the first sleeve 39. In the present case, the securing member 38 may also be referred to as a double clamping sleeve.

Figure 5:
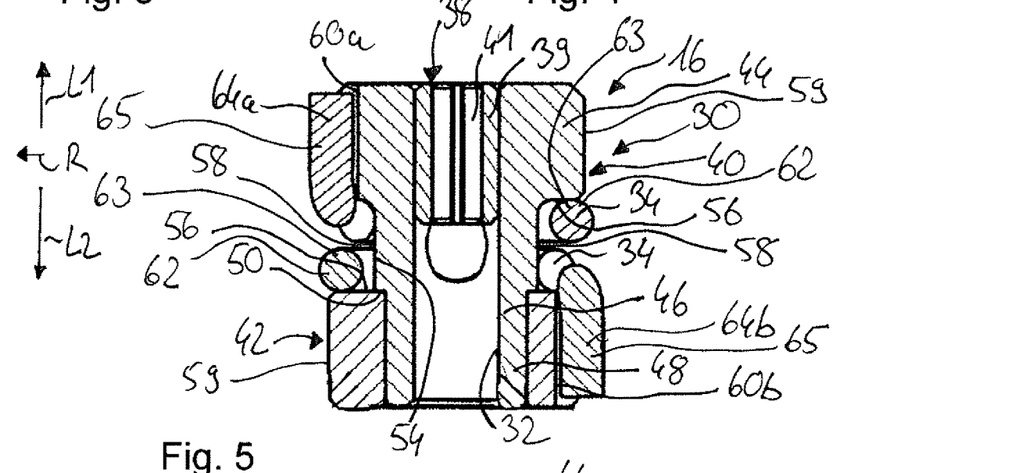
FIG. 5 shows a section through the securing pin along the line V-V in FIG. 4.

The base body 30 is made of metal or plastic and, according to FIG. 5, has a first base body part 40 and a second base body part 42 that are connected to each other positively, non-positively and/or by substance-to-substance connection. In particular, the two base body parts 40, 42 are transversely press-connected.

The first base body part 40 is configured as a hollow cylinder and comprises the through-hole 32, a head portion 44 and a shaft portion 46. The head portion 44 has a first external diameter, and the shaft portion 46 has a second external diameter, wherein the first external diameter is greater than the second external diameter.

Figure 6:
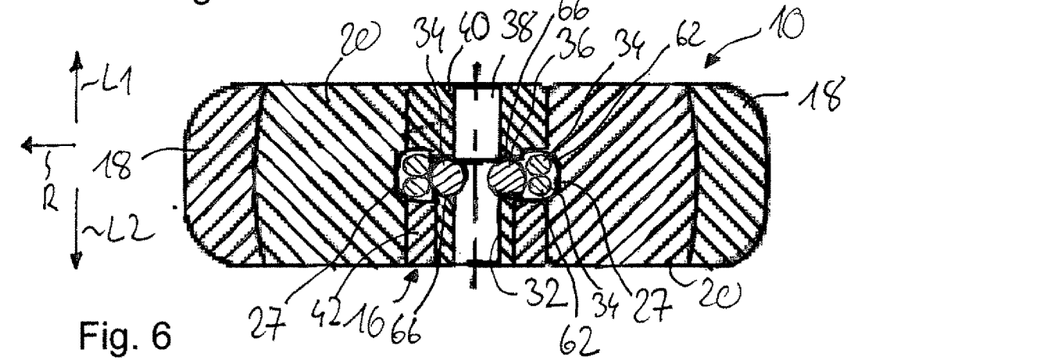
FIG. 6 shows a section through the chain connector and the securing pin along the line VI-VI in FIG. 1.
Figure 7:
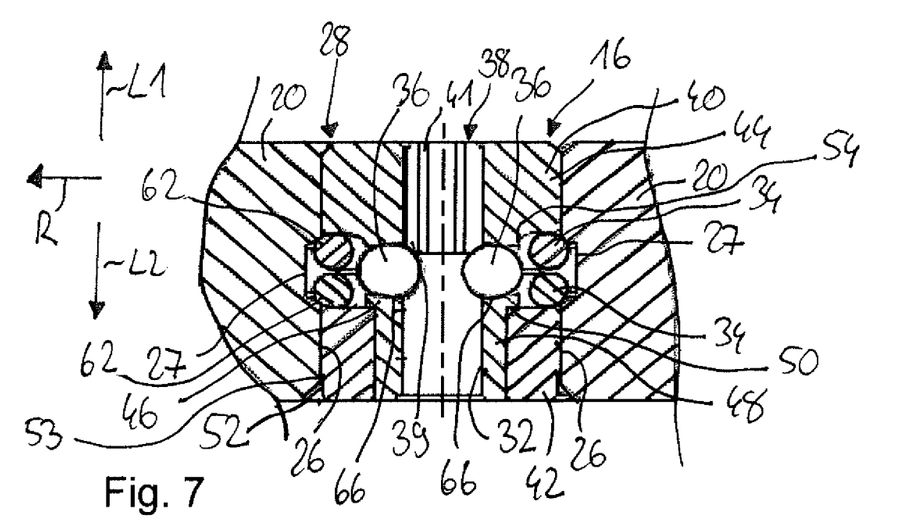
FIG. 7 shows an enlarged illustration of the section from FIG. 6.

As is apparent in FIGS. 6 and 7, two bore holes 66, which are aligned perpendicularly to the central axis of the first base body part 40 with the through-hole 32, are incorporated into the shaft portion 46. The balls 36 of metal are inserted into the bore holes 66, wherein the bore holes 66 are dimensioned in such a way that a portion of the balls 36 protrudes into the through-hole 32 and rests against the securing member 38.

The second base body part 42 is pushed onto an end portion 48 of the shaft portion 46. The end portion 48 has a third external diameter, which is smaller than the second external diameter. Thus, a shoulder 50 is produced which serves as a stop for the second base body part 42 if the latter is pushed, in particular pressed, onto the end portion 48.

The second base body part 42 is configured as a ring and has a fourth external diameter corresponding to the first external diameter. A portion of the second base body part 42 has a centering projection 52 provided with an inserting bevel 53. Together with the inserting bevel 53, the centering projection 52 facilitates the insertion of the securing pin 16 into the opening 28. The centering projection 52 is formed from a portion of a lateral surface 59 of the second base body part 42 and has a fifth external diameter, which is smaller than the fourth external diameter. The inserting bevel 53 forms a transitional region from the fifth external diameter towards the fourth external diameter and is configured as a bevel or chamfer.

In the assembled state of the two base body parts 41, 42, the latter form an annular groove 54 in which the spring ring 34 rests. As is apparent in FIG. 3, the head portion 44 and the second base body part 42 each form a groove wall 56 of the annular groove 54, and the shaft portion 46 forms a groove bottom 58 of the annular groove 54.

Figure 2:
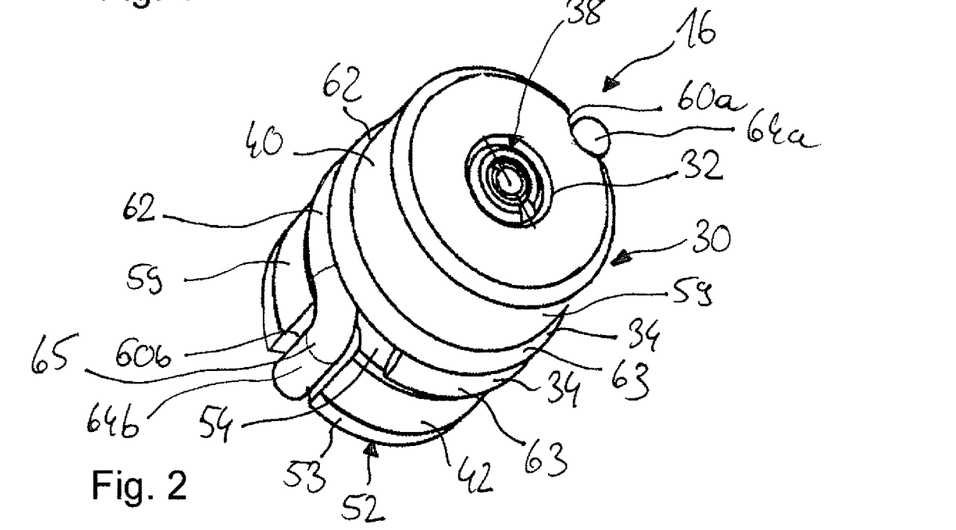
FIG. 2 shows a perspective view of the securing pin of FIG. 1.
Figure 3:
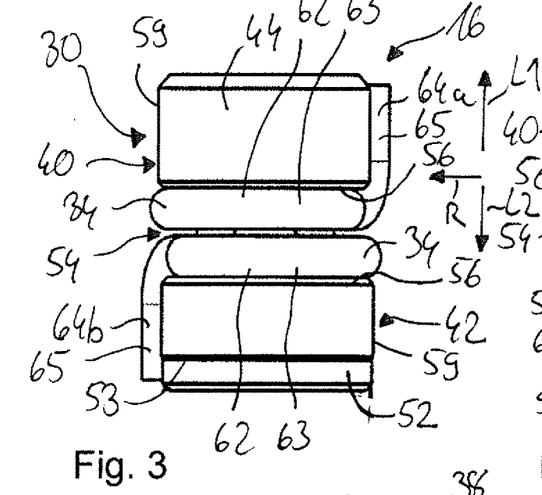
FIG. 3 shows a front view of the securing pin of FIG. 2.
Figure 4:
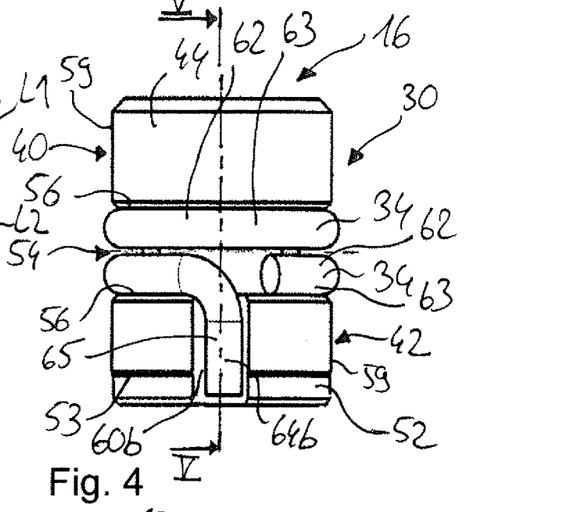
FIG. 4 shows a front view of the securing pin rotated by 90° compared with FIG. 3.

As is apparent from the FIGS. 2 to 4 in particular, longitudinal grooves 60a, 60b, which are in connection with the annular groove 54 and which extend perpendicularly away from the latter in opposite longitudinal directions L1, L2, are incorporated into a lateral surface 59 of the head portion 44 and the second base body part 42. Thus, a first longitudinal groove 60a extends in a first longitudinal direction L1, and a second longitudinal groove 60b extends in a second longitudinal direction L2.

The spring rings 34 are bent from a spring steel wire, wherein each spring ring 34 has a ring portion 62 and a leg 64a, 64b, which projects perpendicularly from the ring portion 62.

The ring portion 62 itself has a winding 63 produced by bending the spring steel wire over at least 300°. The leg 64a, 64b is produced by bending a free end portion 65 of the spring ring 34.

As is apparent in the FIGS. 2 to 5, the ring portions 62 of the spring rings 34 rest in the annular groove 54 in such a way that the ring portions 62 face towards each other and that the legs 64a, 64b extend in opposite longitudinal directions L1, L2, wherein a first leg 64a rests in the first longitudinal groove 60a, and a second leg 64a rests in the second longitudinal groove 60b.

A possible method for installing the securing pin 16 is described below. First, the securing member 38 is inserted, in particular pressed, into the through-hole 32.

The two balls 36 are subsequently inserted into the bore holes 66 of the shaft portion 46. Then, the spring rings 34 are pushed onto the first base body part 40 in such a way that one of the ring portions 62 rests against the groove wall 56 formed by the head portion 44, and the first leg 64a rests in the first longitudinal groove 60a. Then, the second base body part 42 is pushed or pressed onto the end portion 48 until the second base body part 42 rests against the shoulder 50 and the second leg 64b rests in the second longitudinal groove 60b.

Hereinafter, a method is described for connecting two chains and for securing the two chain connector shackles 12, 14 against becoming disengaged. First, one chain connector shackle 12, 14 is respectively hooked into an end of a chain link forming a chain that is not depicted. Subsequently, the chain connector shackles 12, 14 are assembled such that toothing contours 24 engage each other. Then, the securing pin 16 is inserted, in particular pressed, into the opening 28 such that the two legs 64a, 64b face towards the U-shaped connecting portion 22, i.e. are arranged offset by 90° relative to the inner legs 20. Then, the securing member 38, in particular the two sleeves 39, 41, are driven into the through-hole 32, so that the balls 36 are pushed outwards in the radial direction R. Consequently, the ring portions 62 are widened in the radial direction R and pushed into the depressions 27 of the recesses 26, as is shown in FIGS. 6 and 7. The securing pin 16 is thereby secured against being pulled or pushed out of the opening 28.

If the securing pin 16 is inserted into the opening 28 such that the legs 64a, 64b face towards the inner legs 20, then the legs 64a, 64b bend out of shape during insertion into the opening 28. The securing pin 16 is thus destroyed and can no longer be used again.

Figure 8:
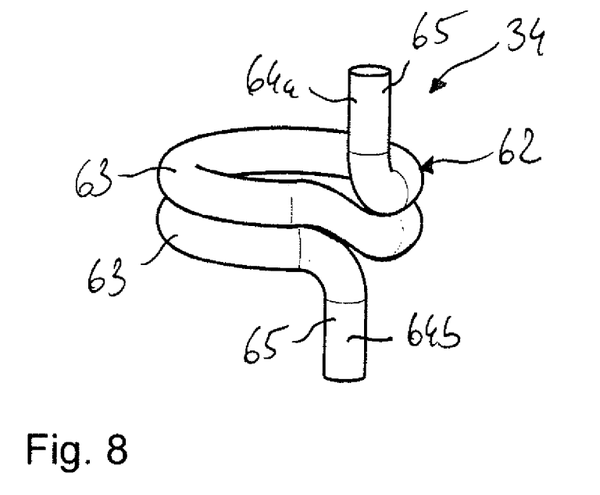
FIG. 8 shows a spring ring according to a second embodiment.

Another embodiment of the spring ring 34 is described below, with the same reference numerals being used for identical or functionally identical parts.

The spring ring 34 shown in FIG. 8 differs from the spring rings 34 shown in the FIGS. 1 to 7 in that the spring ring 34 has the two legs 64a, 64b that extend into opposite longitudinal directions L1, L2. In addition, the ring portion 62 is formed of two windings 63.

The two legs 64a, 64b are produced by bending the free end portions 65 in opposite longitudinal directions L1, L2.

The legs 64a, 64b, which extend in opposite longitudinal directions L1, L2, serve as a positioning and/or installation aid when inserting the securing pin 16 into the opening 28 formed by the chain connector shackles 12, 14. If the securing pin 16 is properly inserted into the opening 28, then the legs 64a, 64b are fully visible from the outside. If the securing pin 16 is incorrectly inserted into the opening 28, then the legs 64a, 64b are bent out of shape during insertion or installation. The securing pin 16 is thus destroyed and can no longer be used again, because the legs 64a, 64b are bent. Thus, it is clearly recognizable that the securing pin 16 has been installed in an incorrect manner.

LIST OF REFERENCE NUMERALS

10 Chain connector
12 First chain connector shackle

14 Second chain connector shackle
16 Securing pin
18 Outer leg
20 Inner leg
22 U-shaped connecting portion
24 Toothing contour
26 Recess
27 Depression
28 Opening
30 Base body
32 Through-hole
34 Spring ring
36 Ball
38 Securing member
39 First sleeve
40 First base body part
41 Second sleeve
42 Second base body part
44 Head portion
46 Shaft portion
48 End portion
50 Shoulder
52 Centering projection
53 Inserting bevel
54 Annular groove
56 Groove wall
58 Groove bottom
59 Lateral surface
60a First longitudinal groove
60b Second longitudinal groove
62 Ring portion
63 Winding
64a First leg
64b Second leg
65 End portion
66 Bore hole
L1 First longitudinal direction
L2 Second longitudinal direction
R Radial direction

The invention claimed is:

1. A securing pin which, in order to secure two chain connector shackles of a chain connector against becoming disengaged, can be inserted into an opening formed by the two chain connector shackles, comprising a base body with a through-hole, at least one spring ring, at least two balls, and a securing member inserted into the through-hole, wherein in a lateral surface of the base body an annular groove is provided, in which the at least one spring ring is inserted, wherein the annular groove is provided with two bore holes which are aligned with the through-hole and in which the balls rest, and wherein the at least one spring ring has at least one leg which extends in the longitudinal direction of the base body and which bends out of shape if the securing pin is inserted into the opening incorrectly.

2. The securing pin according to claim 1, characterized in that two spring rings rest in the annular groove.

3. The securing pin according to claim 1, characterized in that the leg rests in a longitudinal groove that extends away from the annular groove.

4. The securing pin according to claim 1, characterized in that the at least one spring ring has two legs extending in opposite longitudinal directions.

5. The securing pin according to claim 1, characterized in that the at least one spring ring is made from a spring steel wire.

6. The securing pin according to claim 1, characterized in that the base body has a first base body part and a second base body part that are connected to each other positively, non-positively and/or by substance-to-substance connection.

7. The securing pin according to claim 6, characterized in that the first base body part has a head portion and a shaft portion, wherein the second base body part is connected to an end portion of the shaft portion, wherein, in the connected state, the head portion and the second base body part form groove walls of the annular groove and the shaft portion forms a groove bottom of the annular groove.

8. The securing pin according to claim 7, characterized in that the leg rests in a longitudinal groove that is incorporated into the head portion and/or the second base body part.

9. The securing pin according to claim 6, characterized in that the first base body part is a hollow cylinder, and the second base body part a ring.

10. The securing pin according to claim 6, characterized in that the second base body part has a centering projection with an inserting bevel which, together, serve as an installation aid when inserting the securing pin into the opening.

11. A chain connector for connecting two chains formed of links, comprising a first chain connector shackle, a second chain connector shackle and a securing pin, the securing pin comprising a base body with a through-hole, at least one spring ring, at least two balls, and a securing member inserted into the through-hole, wherein in a lateral surface of the base body an annular groove is provided, in which the at least one spring ring is inserted, wherein the annular groove is provided with two bore holes which are aligned with the through-hole and in which the balls rest, and wherein the at least one spring ring has at least one leg which extends in the longitudinal direction of the base body and which bends out of shape if the securing pin is inserted into the opening incorrectly, wherein the two chain connector shackles positively engage each other and form an opening in which the securing pin is inserted.

12. A method for connecting two chains by means of a chain connector and for securing chain connector shackles of the chain connector against becoming disengaged by means of a securing pin, comprising the following steps:
 a. hooking one of the chain connector shackles, respectively, into one end, respectively, of a first chain formed from chain links;
 b. assembling the chain connector shackles so that toothing contours of the chain connector shackles positively engage each other and an opening is created between inner legs of the chain connector shackles;
 c. inserting the securing pin into the opening such that at least one leg of the securing pin is arranged offset by 90° relative to the inner legs; and
 d. driving in a securing member so that balls push a spring ring into depressions of the inner legs, wherein the securing pin comprises a base body with a through-hole, the spring ring, the balls, and the securing member inserted into the through-hole, wherein in a lateral surface of the base body an annular groove is provided, in which the spring ring is inserted, wherein the annular groove is provided with two bore holes which are aligned with the through-hole and in which the balls rest, and wherein the spring ring has at least one leg which extends in the longitudinal direction of the base body and which bends out of shape if the securing pin is inserted into the opening incorrectly.

13. The method according to claim 12, wherein the securing pin is further characterized in that the spring rings rest in the annular groove.

14. The method according to claim 12, wherein the securing pin is further characterized in that the at least one leg of the securing pin rests in a longitudinal groove that extends away from the annular groove.

15. The method according to claim 12, wherein the at least one leg of the spring ring has two legs extending in opposite longitudinal directions.

16. The method according to claim 12, wherein the securing pin is further characterized in that the spring ring is made from a spring steel wire.

17. The method according to claim 12, wherein the securing pin is further characterized in that the base body has a first base body part and a second base body part that are connected to each other positively, non-positively and/or by substance-to-substance connection.

18. The method according to claim 12, wherein the base body has a first base body part having a head portion and a shaft portion, wherein a second base body part is connected to an end portion of the shaft portion, wherein, in the connected state, the head portion and the second base body part form groove walls of the annular groove and the shaft portion forms a groove bottom of the annular groove.

19. The method according to claim 12, wherein the securing pin is further characterized in that a longitudinal groove that extends away from the annular groove is incorporated into the base body having a first base body part and a second base body part at the head portion and/or the second base body part.

\* \* \* \* \*